United States Patent
Koshinuma

(10) Patent No.: US 11,188,625 B2
(45) Date of Patent: Nov. 30, 2021

(54) USER AUTHENTICATION SYSTEM, USER AUTHENTICATION METHOD, PROGRAM, AND INFORMATION STORAGE MEDIUM

(71) Applicant: Rakuten Group, Inc., Tokyo (JP)

(72) Inventor: Takaaki Koshinuma, Tokyo (JP)

(73) Assignee: Rakuten Group, Inc., Tokyo (JP)

(*) Notice: Subject to any disclaimer, the term of this patent is extended or adjusted under 35 U.S.C. 154(b) by 689 days.

(21) Appl. No.: 14/392,235

(22) PCT Filed: Jun. 25, 2014

(86) PCT No.: PCT/JP2014/066900
§ 371 (c)(1),
(2) Date: Dec. 24, 2015

(87) PCT Pub. No.: WO2014/208627
PCT Pub. Date: Dec. 31, 2014

(65) Prior Publication Data
US 2016/0275272 A1   Sep. 22, 2016

(30) Foreign Application Priority Data

Jun. 25, 2013 (WO) .................. PCT/JP2013/067411

(51) Int. Cl.
*G06F 21/00* (2013.01)
*H04L 29/06* (2006.01)
*G06F 21/31* (2013.01)

(52) U.S. Cl.
CPC ...... *G06F 21/31* (2013.01); *G06F 2221/2115* (2013.01)

(58) Field of Classification Search
CPC .......................... G06F 21/31; G06F 2221/2115
See application file for complete search history.

(56) References Cited

U.S. PATENT DOCUMENTS

2005/0090229 A1* 4/2005 Tatsuki .................. G06Q 20/04
                                                    455/406
2014/0068733 A1* 3/2014 Belisario ................. G06F 21/46
                                                    726/6

FOREIGN PATENT DOCUMENTS

JP    2006-172171 A    6/2006
JP    2007-200211 A    8/2007
JP    2007-280154 A   10/2007

OTHER PUBLICATIONS

International Search Report for PCT/JP2014/066900 dated Sep. 9, 2014.

* cited by examiner

*Primary Examiner* — Lisa Lewis
(74) *Attorney, Agent, or Firm* — Sughrue Mion, PLLC

(57) ABSTRACT

A stranger who has come across user information of a user is prevented from being successfully authenticated as the user. A user authentication system includes: an authentication information acquisition unit (20) configured to obtain an entered password of a user; a user authentication unit (22) configured to execute authentication of the user based on the entered password; and an authentication procedure change unit (28) configured to change, when the authentication of the user fails and the entered password matches or is similar to a password candidate that is based on information associated with the user, a procedure of the authentication of the user which is executed by the user authentication unit (22), based on whether or not a genuine password of the user matches or is similar to the password candidate.

13 Claims, 7 Drawing Sheets

| USER ID | PASSWORD HASH | FAILURE LIMIT | FAILURE COUNT | LOCK |
|---|---|---|---|---|
| 001 | abxz32py···· | 2 | 2 | 1 |
| 002 | cypp2a5···· | 4 | 1 | 0 |

FIG.3

ENTER USER ID AND PASSWORD.

USER ID

PASSWORD

LOG IN

FIG.4

USER AUTHENTICATION HAS FAILED.
ENTER USER ID AND PASSWORD AGAIN.

USER ID

PASSWORD

LOG IN

FIG.5

ACCOUNT IS LOCKED.

PLEASE CONTACT ADMINISTRATOR.

FIG.6 subject : ALERT
Date : ××××
From : system@ ×××.××
To : Taro Yamada
------------------------------------------------
A POSSIBLE PASSWORD CRACKING
ATTEMPT HAS BEEN DETECTED.
PLEASE CHANGE YOUR PASSWORD PROMPTLY.
DO NOT USE PERSONAL INFORMATION
FOR PASSWORD.

FIG.8

| USER ID | LAST NAME | FIRST NAME | BIRTH DATE | COUNTRY | ADDRESS | PHONE NUMBER |
|---|---|---|---|---|---|---|
| 001 | Smith | Ken | 19701010 | USA | ×××,Detroit,MI | (313)567-1234 |
| 002 | Yamada | Taro | 20000520 | JAPAN | ×××,Shinjuku-ku,Tokyo | (03)5339-0123 |

FIG.9A

LAST NAME

FIRST NAME

LAST NAME + FIRST NAME

FIRST NAME + LAST NAME

FIG.9B

FIRST LETTER OF FIRST NAME + FIRST LETTER OF LAST NAME + BIRTH DATE

FIRST LETTER OF FIRST NAME + FIRST FOUR DIGITS OF BIRTH DATE

EXCHANGE PLACES BETWEEN FIRST FOUR DIGITS AND LAST FOUR DIGITS OF BIRTH DATE

FIG.9C

Yamada

Taro

YamadaTaro

TaroYamada

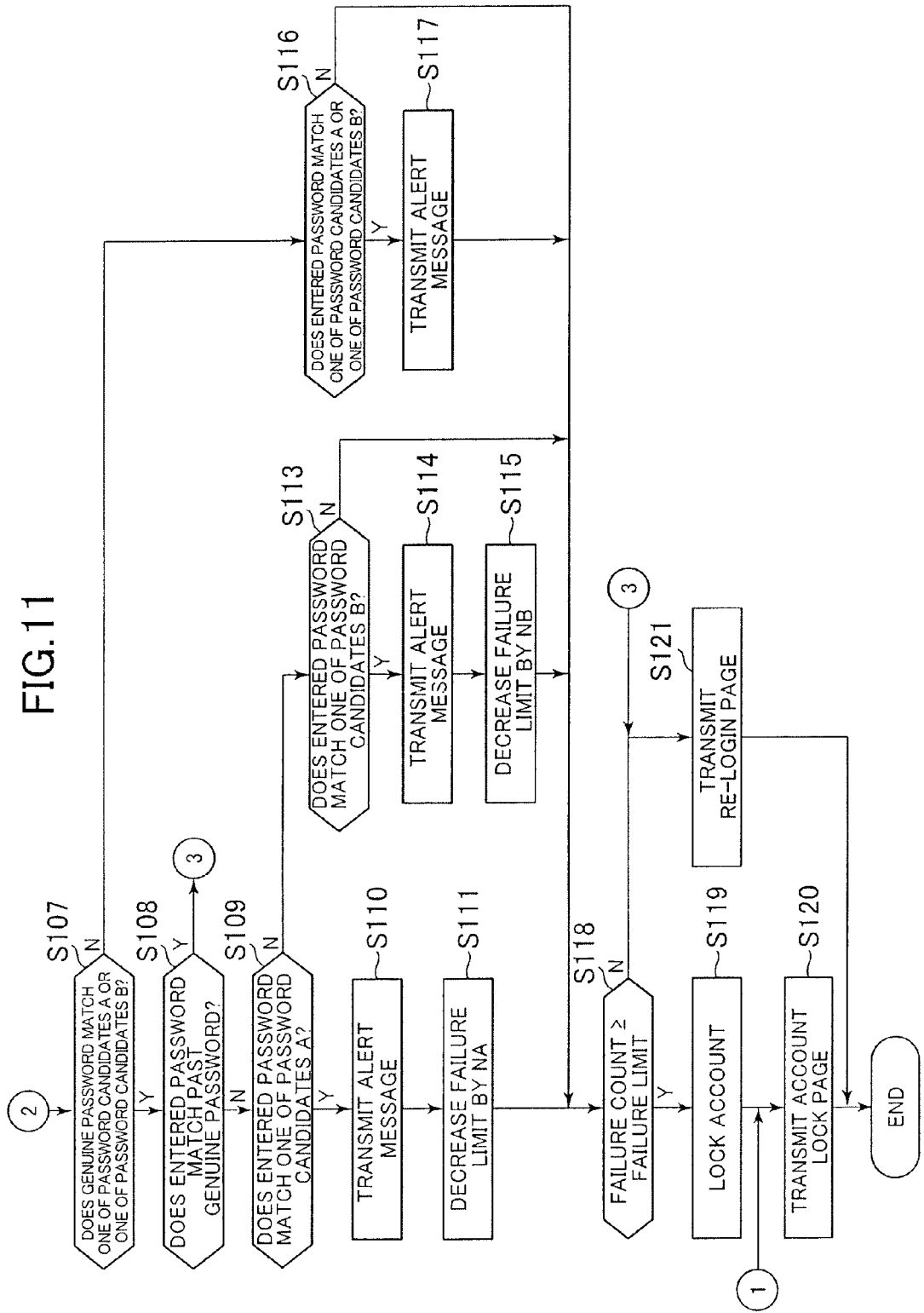

USER AUTHENTICATION SYSTEM, USER AUTHENTICATION METHOD, PROGRAM, AND INFORMATION STORAGE MEDIUM

CROSS REFERENCE TO RELATED APPLICATIONS

This application is a National Stage of International Application No. PCT/JP2014/066900 filed Jun. 25, 2014, claiming priority based on International Patent Application No. PCT/JP2013/067411 filed Jun. 25, 2013, the contents of all of which are incorporated herein by reference in their entirety.

TECHNICAL FIELD

The present invention relates to a user authentication system, a user authentication method, a program, and an information storage medium. The present invention is directed to a countermeasure against password cracking.

BACKGROUND ART

It is common practice to demand the entering of a user ID and a password from a user and to use the entered user ID and password for user authentication at such times as the beginning of a service on the Internet and booting on various computers, for the purpose of determining whether the person attempting to use the service or the computer is a valid user. If entering wrong passwords is permitted an unlimited number of times, a person who is not a valid user can be authenticated successfully by chance in the course of entering passwords numerous times. A known solution is to lock an account by the system when the number of times a wrong password is entered exceeds an upper limit count (JP 2006-172171 A).

SUMMARY OF INVENTION

Technical Problem

However, in the case where a user sets a password based on user information such as the user's birthday or phone number and a stranger finds out this user information, there is an undeniable risk of the stranger succeeding in being authenticated as the user within the upper limit count of wrong password entering, unless the upper limit count is set to an extremely small value.

The present invention has been made in view of the problem described above, and an object of the present invention is therefore to provide a user authentication system, a user authentication method, a program, and an information storage medium with which a stranger who has come across user information of a user is prevented from being successfully authenticated as the user.

Solution to Problem

In order to solve the problem described above, a user authentication system according to one embodiment of the present invention includes: authentication information acquisition means for acquiring an entered password of a user; user authentication means for executing authentication of the user based on the entered password; determination means for determining whether or not a genuine password of the user matches or is similar to a password candidate that is based on information associated with the user; and authentication procedure change means for changing, when the authentication of the user fails and the entered password matches or is similar to the password candidate, a procedure of the authentication of the user which is executed by the user authentication means, based on a result of the determination by the determination means.

Further, a user authentication method according to one embodiment of the present invention includes: acquiring an entered password of a user; executing authentication of the user based on the entered password; determining whether or not a genuine password of the user matches or is similar to a password candidate that is based on information associated with the user; and changing, when the authentication of the user fails and the entered password matches or is similar to the password candidate, a procedure of the authentication of the user, based on whether or not the genuine password matches or is similar to the password candidate.

Further, a program according to one embodiment of the present invention is a program for causing a computer to function as: authentication information acquisition means for acquiring an entered password of a user; user authentication means for executing authentication of the user based on the entered password; determination means for determining whether or not a genuine password of the user matches or is similar to a password candidate that is based on information associated with the user; and authentication procedure change means for changing, when the authentication of the user fails and the entered password matches or is similar to the password candidate, a procedure of the authentication of the user which is executed by the user authentication means, based on a result of the determination by the determination means.

Further, an information storage medium according to one embodiment of the present invention is an information storage medium having stored thereon a program for causing a computer to function as: authentication information acquisition means for acquiring an entered password of a user; user authentication means for executing authentication of the user based on the entered password; determination means for determining whether or not a genuine password of the user matches or is similar to a password candidate that is based on information associated with the user; and authentication procedure change means for changing, when the authentication of the user fails and the entered password matches or is similar to the password candidate, a procedure of the authentication of the user which is executed by the user authentication means, based on a result of the determination by the determination means.

Further, a user authentication system according to one embodiment of the present invention includes: an authentication information acquisition unit configured to obtain an entered password of a user; a user authentication unit configured to execute authentication of the user based on the entered password; and an authentication procedure change unit configured to change, when the authentication of the user fails and the entered password matches or is similar to a password candidate that is based on information associated with the user, a procedure of the authentication of the user which is executed by the user authentication unit, based on whether or not a genuine password of the user matches or is similar to the password candidate.

BRIEF DESCRIPTION OF DRAWINGS

FIG. 3 is a diagram for illustrating an example of a login page.

FIG. 4 is a diagram for illustrating an example of a re-login page.

FIG. 5 is a diagram for illustrating an example of an account lock notification page.

FIG. 6 is a diagram for illustrating an example of an alert message that is sent to a user.

FIG. 8 is a diagram for schematically illustrating what is stored in a user information storage unit.

FIGS. 9A, 9B, 9C and 9D are diagrams for illustrating an example of password candidate generation rules and password candidates that are generated by following the password candidate generation rules.

FIG. 11 is an operation flow chart of the user authentication system.

DESCRIPTION OF EMBODIMENTS

A description is made below in detail of an embodiment of the present invention based on the drawings.

Figures 1, 2:
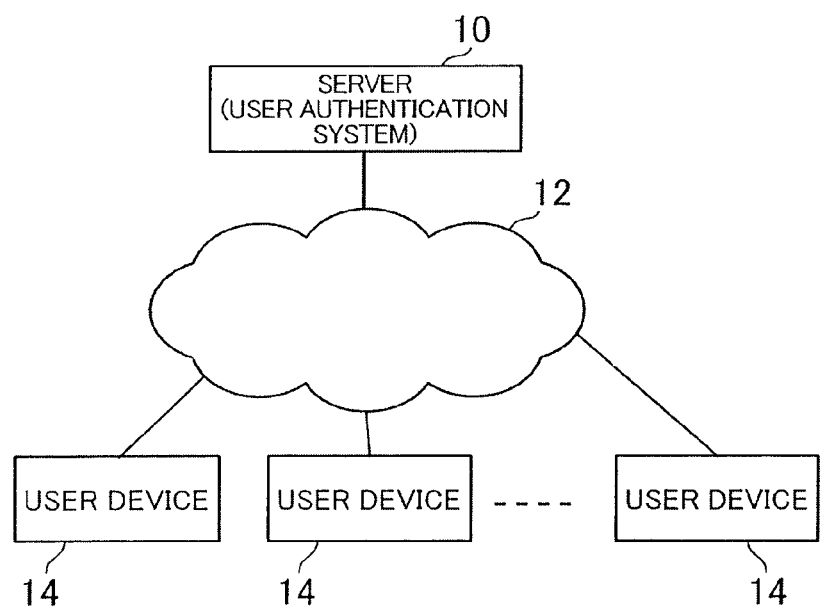
FIG. 1 is a diagram for illustrating a computer network that includes a user authentication system according to an embodiment of the present invention.
FIG. 2 is a diagram for schematically illustrating a password table.

FIG. 1 is a diagram for illustrating a computer network that includes a user authentication system according to the embodiment of the present invention. A server 10 is a server computer system configured to provide a Web service such as an electronic commerce service to a large number of users over a communication network 12, and includes the user authentication system according to the embodiment of the present invention. The server 10 is connected to the communication network 12, which is the Internet or the like. A large number of user devices 14 are connected to the communication network 12 as well in order to receive the service provided by the server 10. The user devices 14 are computers such as internet TVs, personal computers, tablet computers, smartphones, and feature phones, and Web browsers are installed in the user devices 14.

The server 10 includes the user authentication system as mentioned above and, when one of the user devices 14 accesses the server 10, the user authentication system demands a pair of a user ID and a password (authentication information) to be entered. Based on the entered authentication information, the user authentication system determines whether or not the user of the user device 14 is a valid user, in other words, executes user authentication. The server 10 provides a service over the communication network 12 only to a user who is successfully authenticated by the user authentication system.

The server 10 stores a password table illustrated in FIG. 2 for user authentication. The password table of FIG. 2 stores, in association with a user ID for identifying a valid user of the server 10, a hash value of a password of the user, the number of times that a user authentication failure due to successive entering of wrong authentication information is permitted (a limit failure count), a current successive failure count, and a flag that indicates whether or not the user's account is locked. A value "1" of the account lock flag indicates that the account is locked, and a value "0" of the flag indicates that the account is not locked. The server 10 stops providing a service to the user of a locked account even when the correct user ID and the correct password are entered.

FIG. 3 to FIG. 5 are diagrams for illustrating Web pages that are displayed on a display of each user device 14 in connection to user authentication on the server 10. These Web pages are displayed on the user device 14 based on data that is transmitted from the server 10. FIG. 3 is a login page. The login page includes, as illustrated in FIG. 3, fields for entering a user ID and a password, and a button for transmitting the user ID and the password to the server 10. FIG. 4 is a re-login page. The re-login page is a page for entering a user ID and a password again when a user fails in user authentication. The re-login page also includes fields for entering a user ID and a password, and a button for transmitting the user ID and the password to the server 10. FIG. 5 is an account lock notification page. As illustrated in FIG. 5, a message to the effect that the user's account is locked and that the user is prohibited from logging in to the server 10 is written on the account lock notification page.

FIG. 6 is a diagram for illustrating an example of an alert message that is sent to a user. When the user authentication system included in the server 10 determines that a possible password cracking attempt on an account is going on, based on user information such as a last name, a first name, and a birth date, a piece of electronic mail that contains the alert message of FIG. 6 is transmitted to the valid user in this embodiment.

Figure 7:
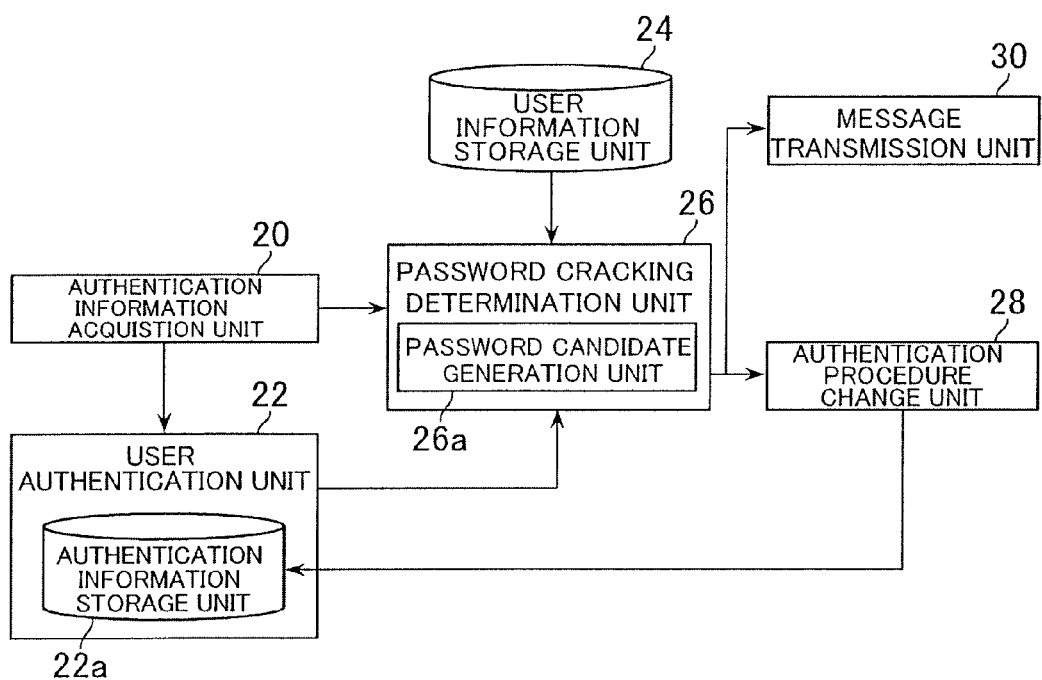
FIG. 7 is a function block diagram of the user authentication system.

FIG. 7 is a function block diagram of the user authentication system included in the server 10. The user authentication system includes, as illustrated in FIG. 7, an authentication information acquisition unit 20, a user authentication unit 22, a user information storage unit 24, a password cracking determination unit 26, a message transmission unit 30, and an authentication procedure change unit 28. The user authentication unit 22 includes an authentication information storage unit 22a, and the password cracking determination unit 26 includes a password candidate generation unit 26a. These components are implemented by executing a user authentication program according to the embodiment of the present invention on the server 10. The program may be stored in a computer readable storage medium such as a CD-ROM, a DVD-ROM, or a semiconductor memory to be installed in the server 10 from the storage medium, or may be downloaded from the communication network 12.

The authentication information acquisition unit 20 is constructed mainly by a communication interface, a CPU, and a memory that are included in the server 10, and obtains a user ID and a password. Specifically, data of the login page illustrated in FIG. 3 is transmitted to one of the user devices 14 in response to a login request transmitted from the user device 14. A user of the user device 14 enters a user ID and a password in the fields on the login page and presses the login button, thereby transmitting the entered user ID and password to the server 10. The authentication information acquisition unit 20 obtains a user ID and a password from the user device 14 in this manner.

The user authentication unit 22 is constructed mainly by the CPU, the memory, and a storage device that are included in the server 10, and executes user authentication based on a user ID and a password that are obtained by the authentication information acquisition unit 20. The authentication information storage unit 22a is constructed mainly by the storage device, and stores the password table of FIG. 2. The user authentication unit 22 calculates a password hash when a user ID and a password are obtained, and also reads a password hash that is associated with the user ID out of the authentication information storage unit 22a. The user authentication unit 22 determines whether or not the calculated password hash matches the password hash read out of the authentication information storage unit 22a. The user authentication unit 22 determines that the user is successfully authenticated when the calculated password hash matches the password hash, and determines that the user fails in user authentication when the calculated password hash does not match the password hash. The number of times user authentication fails in succession (a failure count) is managed in the password table and, when this failure count exceeds an upper limit count, the account is locked and a value "1" of the flag which indicates the fact is recorded in the password table.

A locked account may be unlocked by an administrator of the server 10. In other words, the administrator may return the value of the account lock flag that is recorded in the password table to "0" at his/her discretion. Alternatively, the server 10 may measure the time elapsed since the change of the account lock flag in the password table to "1" in order to return the account lock flag to "0" when the elapsed time reaches a given locked time. This way, an account can be unlocked automatically after being locked for a predetermined locked time. The failure limit and the failure count in the password table may be reset to initial values when a locked account is unlocked.

The user information storage unit 24 is constructed mainly by the storage device, and stores user information illustrated in FIG. 8. As illustrated in FIG. 8, the user information storage unit 24 stores, for each user, a plurality of information items such as the user's last name, first name, birth date, residing country, address, and phone number in association with the user ID of the user. The user information storage unit 24 may of course store other information items such as the user's anniversary and graduating school. Other than typical personal information as those in FIG. 8, any kind of information about the user such as a favorite singer and a favorite food can be stored in the user information storage unit 24. Some or all of these information items may be information entered by the user himself/herself in advance for other purposes, for example, the shipping of a product in an electronic commerce service, or may instead be information that the user enters solely for user authentication processing executed by the user authentication system.

The password cracking determination unit 26 is constructed mainly by the CPU and the memory that are included in the server 10. The password candidate generation unit 26a is also constructed mainly by the CPU and the memory that are included in the server 10. The password candidate generation unit 26a generates password candidates based on user information that is stored in the user information storage unit 24. The password cracking determination unit 26 determines whether or not a password obtained by the authentication information acquisition unit 20 matches a password candidate generated by the password candidate generation unit 26a when user authentication by the user authentication unit 22 fails. In the case where the password matches the password candidate, the password cracking determination unit 26 determines that there is a possibility of password cracking being attempted. The password cracking determination unit 26 may determine that a possible password cracking attempt is going on also when the degree of similarity between the password and the password candidate is calculated to be greater than a given threshold, in other words, when the password and the password candidate are similar. In the case where a password entered by a user matches or is similar to a past genuine password, the password cracking determination unit 26 is allowed to determine that there is no possible password cracking attempt, even though the entered password is created based on user information, because this is considered as a case of the valid user entering a past genuine password by confusion.

FIG. 9A and FIG. 9B are an example of password candidate generation rules that are used by the password candidate generation unit 26a. The password candidate generation unit 26a reads the password candidate generation rules of FIG. 9A and FIG. 9B line by line, and generates password candidates by following the read rules. FIG. 9C is an example of password candidates A, which are generated by following rules A of FIG. 9A. FIG. 9D is an example of password candidates B, which are generated by following rules B of FIG. 9B. Illustrated in FIG. 9C and FIG. 9D are the results of applying the rules A of FIG. 9A and the rules B of FIG. 9B to user information of a user whose user ID is "002" in FIG. 8. The password candidate generation rules A of FIG. 9A are rules for generating the password candidates A, which are easy targets for hacking. The password candidate generation rules B of FIG. 9B are rules for generating the password candidates B, which are difficult to crack. The password candidates B are composed from more elements of user information than those used in the password candidates A, and from elements of user information that are hard to come by for strangers. In the case where the password candidates B are entered by a third party, the person is considered to be in possession of the user's information that is very detailed and that is hard to come by, and the probability of password cracking is accordingly high.

A password candidate generated by the password candidate generation unit 26a can be the entirety of one information item as it is, as written in the first line and the second line in FIG. 9A. For example, the entirety of an information item such as a last name or a first name can be a password candidate as it is.

The password candidate generation unit 26a may generate a password candidate by combining at least a part of each information item that is included in user information as written in the third row and the fourth row in FIG. 9A and the first row and the second row in FIG. 9B. A password candidate may be generated by combining the entirety of one information item with the entirety of another information item as they are, as in combining the last name and the first name to generate "YamadaTaro". A password candidate may also be generated by combining a part of each information item out of one or more information items with the entirety of each information item out of one or more information items, as in combining the first letter of the first name and the first letter of the last name with the birth date to generate "TY20000520". Another way to generate a password candidate is extracting a part of each of a plurality of information items and combining the extracted parts, as in combining the first letter of the first name and the first four digits of the birth date to generate "T2000". The password candidate generation unit 26a may generate a password candidate by breaking one information item into a plurality of elements and selecting some elements or exchanging a plurality of elements, as in exchanging places between the first four digits and last four digits of the birth date to generate "05202000".

The password candidate generation unit 26a thus generates, as password candidates, based on user information of each user, passwords that are expected to be tried by a person with a malicious intent who has come by user information of others. The password cracking determination unit 26 determines that there is a possibility of password cracking being attempted when a password generated in this manner matches or is similar to a wrong password that has actually been transmitted from the user device 14. In this embodiment, a plurality of sets of password candidate generation rules, here, the rules A and the rules B, are provided to reflect different levels of cracking difficulty as described above. In the case where an entered password matches or is similar to one of the password candidates B, which are difficult to crack, it is determined that a person with a malicious intent who is in possession of the user's detailed and difficult-to-come-by information may be attempting more serious password cracking, and the upper limit count of user authentication failure is dropped significantly compared to the case where an entered password matches or is similar to one of the password candidates A, which are easy to crack. In short, the mode of change to user authentication is varied depending on the specifics of a password candidate that matches or is similar to an entered password. This facilitates account locking and, consequently, a more powerful measure for the prevention of cracking can be taken when there is a possibility that serious password cracking is being attempted.

The authentication procedure change unit 28 is constructed mainly by the CPU and the memory that are included in the server 10. When the password cracking determination unit 26 determines that there is a possibility of password cracking being attempted, the authentication procedure change unit 28 changes the procedure of user authentication executed by the user authentication unit 22. Specifically, the authentication procedure change unit 28 decreases the failure limit stored in the authentication information storage unit 22a. The failure limit is set to a value smaller than the initial value (here, "4"), for example, "1" or "2". The failure limit value may instead be decreased from the initial value by a given value each time the password cracking determination unit 26 determines that there is a possibility of password cracking being attempted. However, the authentication procedure change unit 28 changes the procedure of user authentication only when the user's genuine password matches or is similar to one of the password candidates A, or one of the password candidates B, generated by the password candidate generation unit 26a. Specifically, the authentication procedure change unit 28 holds a plain text of the user's genuine password in addition to, or in place of, a hash value to determine whether or not the genuine password matches or is similar to one of the password candidates A or one of the password candidates B. In the case where the genuine password matches or is similar to any of the password candidates, the authentication procedure change unit 28 changes the procedure of user authentication executed by the user authentication unit 22. This way, changing the procedure of user authentication only when there is a strong possibility of success in password cracking is accomplished. When the genuine password matches or is similar to one of the password candidates A, or one of the password candidates B, a password cracking attempt is likely to succeed eventually if passwords analogized from user information are entered one after another. A change to the procedure of user authentication is allowed only in such cases in this embodiment, thereby improving the conveniences of users.

The authentication procedure change unit 28 is also allowed to change a genuine password when it is determined that there is a possibility of password cracking being attempted. The password hash stored in the authentication information storage unit 22a is rewritten in this case. A password preferred as the new genuine password is one that is hard to analogize from the user information stored in the user information storage unit 24. For example, the authentication procedure change unit 28 can generate a new password based on a random number. It is preferred that a password generated based on a random number be set as the new password only when it is determined that the random number-based password does not match a password candidate generated by the password candidate generation unit 26a. It is conceivable that this reduces the chance of a person with a malicious intent succeeding in password cracking. While the authentication information storage unit 22a here stores a password hash of a genuine password as information of the genuine password and the password hash is used in user authentication, the authentication information storage unit 22a may store a plain text of the genuine password to use the plain text in user authentication. In this case, the plain text of the genuine password stored in the authentication information storage unit 22a is rewritten when the genuine password is changed.

The message transmission unit 30 is constructed mainly by the communication interface, the CPU, and the memory that are included in the server 10. When the password cracking determination unit 26 determines that there is a possibility of password cracking being attempted, the message transmission unit 30 transmits the alert message of FIG. 6 to an e-mail address of the user that is registered in advance.

Figure 10:
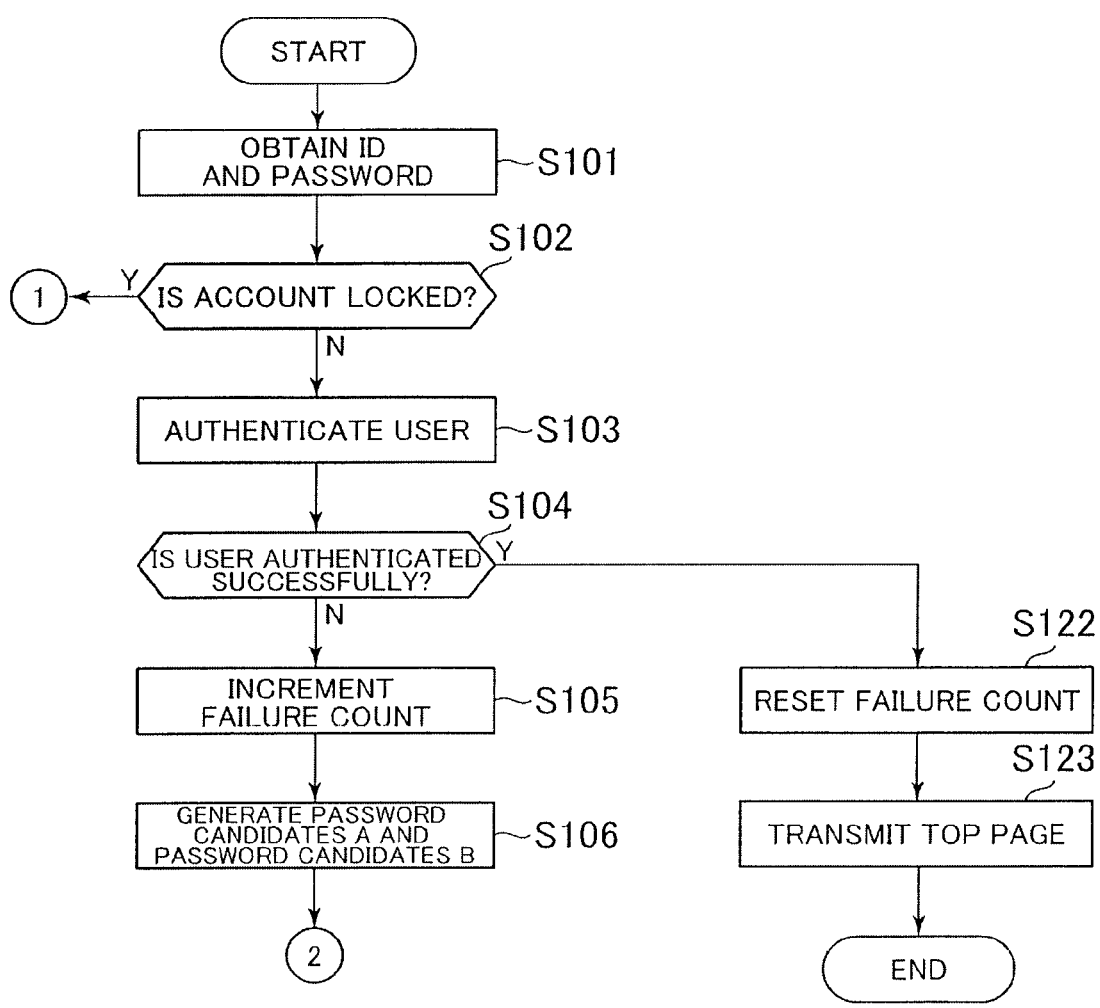
FIG. 10 is an operation flow chart of the user authentication system.

FIG. 10 and FIG. 11 are operation flow charts of the user authentication system included in the server 10. Processing illustrated in FIG. 10 and FIG. 11 is executed on the server 10 when a user ID and a password are transmitted from one of the user devices 14 via the page illustrated in FIG. 3 or FIG. 4. First, the authentication information acquisition unit 20 obtains the user ID and the password (S101) as illustrated in FIG. 10. The user authentication unit 22 refers to the password table to check whether or not the account lock flag that is associated with the user ID is "1" (already locked) (S102). When the flag is "1", the user authentication unit 22 transmits data of the account lock notification page illustrated in FIG. 5 to the user device 14 (S120 of FIG. 11), and ends the processing. When the flag is "0", the user authentication unit 22 executes user authentication (S103). When the hash of the obtained password matches the password hash stored in the password table, which means that the user is successfully authenticated (S104), the failure count stored in the password table is reset to zero (S122). The failure limit may also be reset to the initial value at this point. Thereafter, data of a top page (not shown) of the Web service is transmitted to the user device 14 (S123), and then the processing is ended.

When it is determined in Step S104 that the user authentication has failed, the user authentication unit 22 increments the failure count in the password table by 1 (S105). Next, the password candidate generation unit 26a of the password cracking determination unit 26 generates password candidates (S106).

As illustrated in FIG. 11, the authentication procedure change unit 28 next determines whether or not the user's genuine password matches one of the password candidates A, or one of the password candidates B (S107). In the case where the genuine password matches none of the password candidates, the password cracking determination unit 26 determines whether or not the entered password that has been obtained in Step S101 matches one of the generated password candidates A, or one of the generated password candidates B (S116). When the entered password matches any of the password candidates, the message transmission unit 30 transmits the message of FIG. 6 to the user device 14 (S117). When it is determined in Step S116 that the entered password matches none of the password candidates, on the other hand, Step S117 is skipped and the processing proceeds to Step S118.

When it is determined in Step S107 that the genuine password matches one of the password candidates A, or one of the password candidates B, the password cracking determination unit 26 determines whether or not the entered password that has been obtained in Step S101 matches a past genuine password of the user (S108). The processing proceeds to Step S121 when the passwords match, and to Step S109 when the passwords do not match.

In Step S109, the password cracking determination unit 26 determines whether or not the entered password that has been obtained in Step S101 matches one of the generated password candidates A. In the case where the entered password matches any of the password candidates A, the message transmission unit 30 transmits the message of FIG. 6 to the user device 14 (S110). The authentication procedure change unit 28 then changes the procedure of user authentication. Specifically, the authentication procedure change unit 28 decreases a failure limit that is stored in the password table in association with the user ID obtained in Step S101 by a given numerical value NA (S111).

When the password obtained in Step S101 matches none of the generated password candidates A, on the other hand, the password cracking determination unit 26 determines whether or not the entered password that has been obtained in Step S101 matches one of the generated password candidates B (S113). In the case where the entered password matches any of the password candidates B, the message transmission unit 30 transmits the message of FIG. 6 to the user device 14 (S114). The authentication procedure change unit 28 then changes the procedure of user authentication. Specifically, the authentication procedure change unit 28 decreases a failure limit that is stored in the password table in association with the user ID obtained in Step S101 by a given numerical value NB (S115). The numerical values NA and NA are each a value smaller than the default failure limit, and the value NA is smaller than NB. For example, the default failure limit is 3, NA is 1, and NB is 2. Decreasing the failure limit by the relatively large numerical value NB when one of the password candidates B, which are supposed to be difficult to crack, is actually entered enables the server 10 to lock the account immediately.

In the case where the password obtained in Step S101 matches none of the generated password candidates B (S113), on the other hand, Step S114 and Step S115 are skipped and the processing proceeds to Step S118.

The authentication procedure change unit 28 may rewrite in Step S111 a password hash that is stored in the password table in association with the user ID obtained in Step S101 with a hash of a new password. The message transmission unit 30 in this case may transmit a message that contains the new password to the user device 14 in Step S110. Similarly, the authentication procedure change unit 28 may rewrite in Step S115 a password hash that is stored in the password table in association with the user ID obtained in Step S101 with a hash of a new password. The message transmission unit 30 in this case may transmit a message that contains the new password to the user device 14 in Step S114. The authentication procedure change unit 28 may be configured such that a forced change of a genuine password as this is made only in Step S115 and not in Step S111. This way, the number of times a genuine password is changed forcedly can be limited to a number that is deemed necessary based on the probability of cracking.

Thereafter, the user authentication unit 22 compares the failure count and the failure limit that are stored in the password table (S118). When the failure count is equal to or higher than the failure limit, the account lock flag in the password table is changed to "1" (S119), data of the password lock notification page illustrated in FIG. 5 is transmitted to the user device 14 (S120), and then the processing is ended. When the failure count is less than the failure limit, on the other hand, data of the re-login page illustrated in FIG. 4 is transmitted to the user device 14 (S121), and the processing is ended.

According to the user authentication system described above, where password candidates that are expected to be tried by a person with a malicious intent are generated based on user information to determine whether or not a password that is actually transmitted from the relevant user device 14 matches or is similar to any of the password candidates, whether there is a possibility of password cracking being attempted can be determined in a favorable manner. In addition, when there is a possibility of password cracking being attempted, the procedure of user authentication is changed by changing the password or changing the upper limit to user authentication failure, thus preventing a person with a malicious intent from logging in.

The present invention is not limited to the embodiment described above, and various modifications can be made. For instance, a change to the user authentication procedure that is based on the possibility of password cracking does not need to be made each time a user ID and a password are obtained from one of the user devices 14. The procedure change processing may be executed, for example, only when access is determined as possible invalid access based on various types of information such as a time at which the user ID and the password have been obtained, the network address of the user device 14, and the type of the user device 14.

When it is determined that there is a possibility of password cracking being attempted, the duration of account locking, namely, the locked time, may be extended. For instance, the number of times that the answer is "yes" (Y) in Step S109, Step S113, and Step S116 of FIG. 11 (a cracking count=the number of times the alert message is transmitted) may be counted for each account in order to extend the locked time for each account separately based on the cracking count. When the cracking count reaches a given count, the locked time may be extended by a given length of time, for example. A longer locked time may instead be set for an account that has a higher cracking count. Alternatively, a locked time or a length of time to be added to the locked time (an additional time) may be managed for each account in order to increase the locked time or the additional time by a given length of time each time the answer is turned out to be Y in Step S109, Step S113, and Step S116 of FIG. 10. The cracking count, the locked time, and the additional time may be reset to their respective initial values when the locked account is unlocked.

The authentication information storage unit 22a may store an auxiliary password for each account. In this case, the user may be asked to enter the auxiliary password when it is determined that the answer has been "yes" (Y) in at least one of Step S109, Step S113, and Step S116 of FIG. 11 prior to Step S121, or when it is determined that the answer to these steps has been "yes" at least a given number of times, which is twice or more. The user authentication unit 22 then executes user authentication with the use of an auxiliary password that is entered. Data of the re-login page illustrated in FIG. 4 is not transmitted to the user device 14 unless the user is successfully authenticated with the use of the auxiliary password, and user authentication that uses the user ID and the (original) password is not executed in this case. This presents a more powerful way of preventing a person with a malicious intent from successfully logging in when there is a possibility of password cracking being attempted.

The invention claimed is:

1. A user authentication system, comprising:
an authentication information acquisition unit for acquiring an entered password of a user;
an user authentication unit for executing authentication of the user based on the entered password;
a determination unit for determining whether or not a genuine password of the user matches or is similar to a password candidate that is based on information associated with the user; and
an authentication procedure change unit for changing, when the authentication of the user fails and the entered password matches or is similar to the password candidate, a procedure of the authentication of the user which is executed by the user authentication unit, based on a result of the determination by the determination unit.

2. The user authentication system according to claim 1, wherein the authentication procedure change unit is configured to be restricted from making a change when the entered password matches or is similar to a past genuine password of the user.

3. The user authentication system according to claim 1, wherein the authentication procedure change unit is configured to vary specifics of the change depending on specifics of the password candidate.

4. The user authentication system according to claim 1, wherein the authentication procedure change unit comprises unit for changing the genuine password of the user.

5. The user authentication system according to claim 1, wherein the user authentication unit is configured to stop the authentication of the user when the authentication of the user fails as many times as a given upper limit count in succession, and
wherein the authentication procedure change unit comprises unit for lowering the given upper limit count.

6. The user authentication system according to claim 1, further comprising:
a message transmission unit for transmitting a message to the user when the authentication of the user fails and the entered password matches or is similar to the password candidate.

7. The user authentication system according to claim 1, further comprising:
a password candidate generation unit for generating the password candidate based on the information that is associated with the user.

8. The user authentication system according to claim 7, wherein the information associated with the user comprises at least one information item, and
wherein the password candidate generation unit is configured to generate the password candidate by breaking each of the at least one information item into a plurality of elements, and selecting some of the plurality of elements or rearranging the plurality of elements.

9. The user authentication system according to claim 7, wherein the information associated with the user comprises at least two information items, and
wherein the password candidate generation unit is configured to generate the password candidate by combining at least a part of each of the at least two information items.

10. The user authentication system according to claim 1, further comprising:
an invalid access determination unit for determining a possibility of invalid access,
wherein the determination by the determination unit and the change by the authentication procedure change unit are based on a result of the determination by the invalid access determination unit.

11. A user authentication method, comprising:
acquiring an entered password of a user;
executing authentication of the user based on the entered password;
determining whether or not a genuine password of the user matches or is similar to a password candidate that is based on information associated with the user; and
changing, when the authentication of the user fails and the entered password matches or is similar to the password candidate, a procedure of the authentication of the user, based on whether or not the genuine password matches or is similar to the password candidate.

12. A non-transitory computer-readable storage medium having stored thereon a program for causing a computer to function as:
an authentication information acquisition unit for acquiring an entered password of a user;
an user authentication unit for executing authentication of the user based on the entered password;
a determination unit for determining whether or not a genuine password of the user matches or is similar to a password candidate that is based on information associated with the user; and
an authentication procedure change unit for changing, when the authentication of the user fails and the entered password matches or is similar to the password candidate, a procedure of the authentication of the user which is executed by the user authentication unit, based on a result of the determination by the determination unit.

13. A user authentication system, comprising:
an authentication information acquisition unit configured to obtain an entered password of a user;
a user authentication unit configured to execute authentication of the user based on the entered password; and
an authentication procedure change unit configured to change, when the authentication of the user fails and the entered password matches or is similar to a password candidate that is based on information associated with the user, a procedure of the authentication of the user which is executed by the user authentication unit, based on whether or not a genuine password of the user matches or is similar to the password candidate.

* * * * *